June 4, 1974  W. KUGEL  3,814,654
METHOD TO CONNECT CARDBOARD, PAPER OR THE LIKE
Filed Dec. 1, 1971
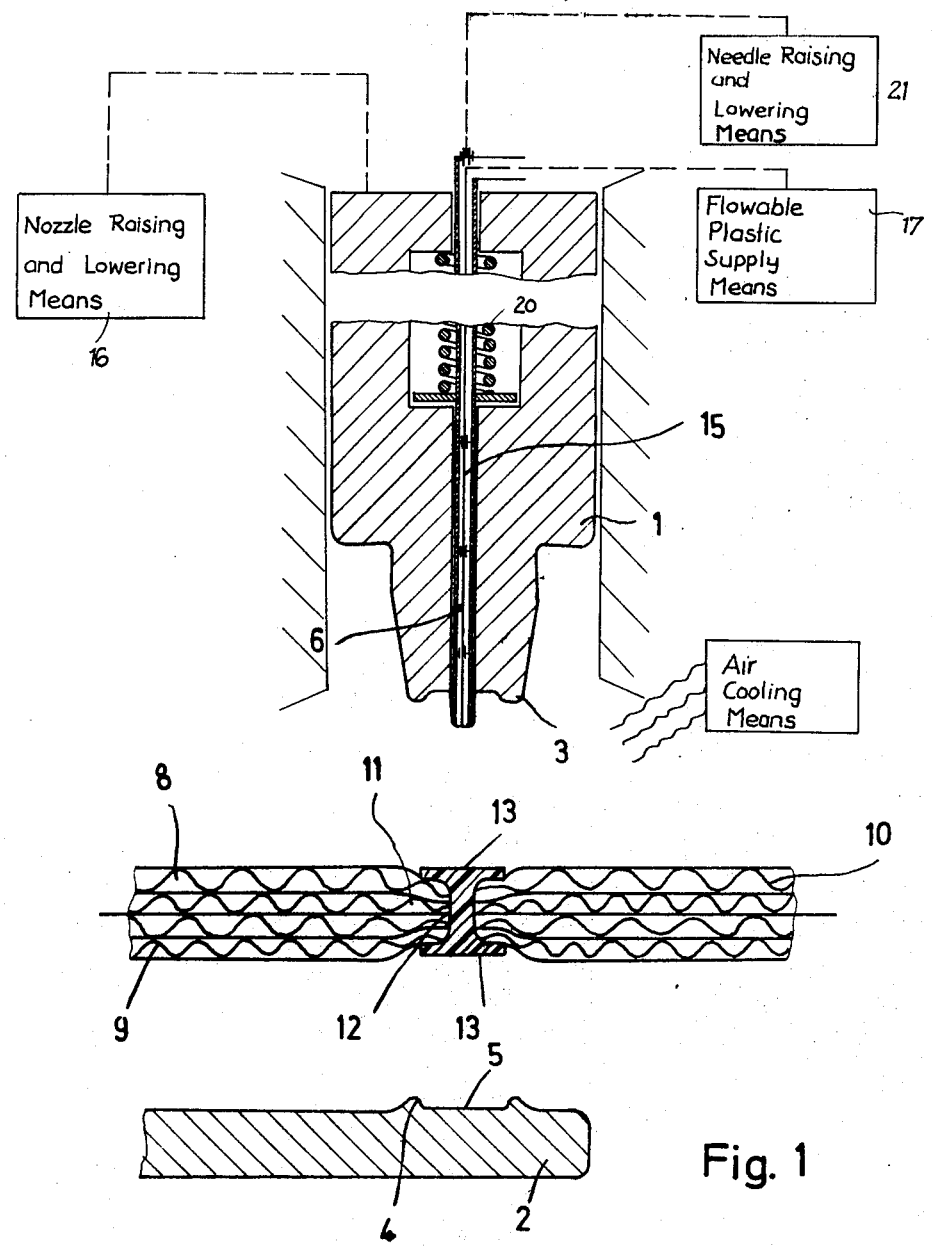
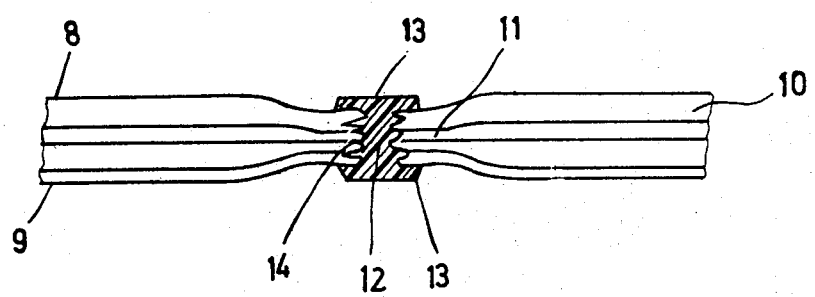
Fig. 2

United States Patent Office 3,814,654
Patented June 4, 1974

3,814,654
METHOD TO CONNECT CARDBOARD, PAPER
OR THE LIKE
Walter Kugel, Pluderhausen, Germany, assignor to
Wilhelm Bahmuller, Pluderhausen, Germany
Filed Dec. 1, 1971, Ser. No. 203,639
Claims priority, application Germany, Dec. 11, 1970,
P 20 61 064.4
Int. Cl. B32b 31/00; B29d 3/00
U.S. Cl. 156—290   7 Claims

ABSTRACT OF THE DISCLOSURE

Method for connecting flat parts formed of cardboard and especially corrugated cardboard, or the like, by means of plastic material whereby the two flat parts to be connected are overlaid and flowable liquid plastic material is forced through the overlaid parts to form a plastic stem which extends through the overlaid parts. The plastic is forced through with sufficient pressure so as to form extensions extending from the plastic stem in the lateral direction of the flat parts, the extensions extending also between said parts, and then the plastic material is allowed to harden, thereby securing said parts together.

The present invention relates to a method for connecting cardboard, paper, corrugated cardboard, hardboard, or like parts, by means of a plastic material.

In the production of boxes made of corrugated cardboard, hardboard, or the like, parts of the box-blanks must be securely connected with each other. Previously, metal staples or hooks have generally been used, which have the advantage of providing a very stable connection and being rapidly driven in by means of stapling machines. However, when such boxes are used for packing fragile goods, such as furniture components, household objects with fragile surfaces, or the like, there is the difficulty that the metal staples or hooks can scratch or otherwise damage the goods packed in the box. For this reason, adhesive connections using plastic base adhesives have been used to a great extent. However, such adhesive connections involving a large surface area require a relatively long period of time for hardening, and additionally are more expensive to produce.

Therefore, the main object of the present invention is to provide a method for the connection of cardboard, paper, or the like, and more particularly for corrugated cardboard parts, wherein the disadvantages of the metal staples which could cause damage to the goods packed, and the disadvantages of the expensive and time consuming process of making adhesive connections, are substantially reduced or eliminated.

SUMMARY OF THE INVENTION

In accordance with the present invention, the parts to be joined, which are made of cardboard, paper, corrugated cardboard, or the like, are overlaid on each other and a flowable plastic material is forced through the overlaid parts to form a plastic stem which extends through the parts. The plastic stem is formed with sufficient force such that material extends from the plastic stem in the lateral direction of the parts to be joined and between the parts. The plastic is then allowed to harden to form an improved connection in a simple and efficient manner.

In the case where corrugated cardboard, or the like is used, the laterally extending plastic material, which extends from the plastic stem, is forced within the hollows or interstices of the parts, thereby further improving the integrity of the connection. In accordance with a further feature of the invention, laterally extending head-members are integrally formed with the plastic stems at both ends thereof, to further secure the connection. In accordance with still another feature of the invention, the plastic material is forced in, relative to the parts to be connected together, with sufficient pressure so as to penetrate the paper, or cardboard, or the like pieces being joined.

The apparatus used in the present invention includes a movable nozzle which is movable to and away from the parts being joined, and means for pressing the nozzle against the parts being joined. Further provided is means for driving flowable liquid plastic under pressure through the parts being joined, the plastic then being allowed to harden to provide the joint.

BRIEF DESCRIPTION OF THE DRAWINGS

FIG. 1 is a cross-sectional side view of a partial schematic representation of the apparatus in accordance with the present invention, shown connecting two corrugated cardboard parts; and FIG. 2 is a more detailed view, in cross section in the longitudinal direction of the corrugations, of two corrugated cardboard parts connected together in accordance with the present invention.

DETAILED DESCRIPTION OF PREFERRED EMBODIMENT

Referring to FIG. 1, a nozzle holder 1 is mounted (by means not shown) so as to be movable in the direction to and away from the corrugated cardboard parts 8 and 9 which are to be joined together. A nozzle raising and lowering means 16, generally shown as a block in the drawings, is provided for raising and lowering the nozzle 1. The raising and lowering mechanism 16 may be any type of mechanism well known in the art and a more detailed description thereof is not deemed necessary for a proper understanding of the present invention. The corrugated cardboard parts 8 and 9 are mounted on a fixed base support member 2. On the lowermost surface of the nozzle holder 1 there is formed a stamping bulge 3, preferably of annular shape, which registers with a corresponding bulge 4 on the base support 2, bulge 4 also preferably having an annular shape. As illustrated, the bulge 4 encloses a depression 5, as does bulge 3, the depression-bulge combination forming a sealing cup.

A spray nozzle 6 is displaceably installed in the nozzle holder 1 and is biassed downward by elastic means which are illustrated by spring 20. A flowable liquid plastic supply means 17, shown generally by a block in FIG. 1, is connected to nozzle 6 for driving flowable liquid plastic material out of a storage container under a high pressure through nozzle 6. The flowable plastic supply means 17 preferably includes a high pressure pump, for example, for delivering the flowable liquid plastic through the nozzle 6.

The apparatus illustrated in FIG. 1 operates as described below. It should be clear that the apparatus of FIG. 1 is illustrated for use with corrugated cardboard parts. However, it should be clear that the invention is equally applicable for joining together cardboard parts, paper parts, hardboard parts, fibrous parts, or the like.

The corrugated cardboard parts 8 and 9, which need not be pre-punched or perforated are overlaid on one another and are placed on the base support member 2.

Then, the nozzle holder 1 is lowered onto the corrugated cardboard parts 8 and 9 by means of raising and lowering means 16 and pressed against the corrugated cardboard parts 8 and 9 so that the corrugations 10 are crushed together in the area of the connecting point (that is, in the area of 11) by means of the bulges 3 and 4 which cooperate to perform such crushing. Since bulges 3 and 4 are preferably annular, the corrugations 10 are also crushed in the longitudinal direction of the corrugations in the area of the connecting point 11, and the resulting depressed portion results in hollow areas within the areas 5 defined by the bulges 3 and 4. These hollow areas 5 are closed off by the bulges.

The nozzle is biased against the pressed together cardboard parts 8 and 9. Flowable plastic supply means 17 forces flowable plastic out of the nozzle under high pressure, whereby the plastic is pressed through the cardboard parts 8 and 9 such that a stem portion 12 is formed, the stem portion having laterally extending plate-like head portions 13 at the ends thereof. The head portions 13 are formed within the areas defined by the bulges 3 and 4. As more particularly seen in FIG. 2, the plastic is pressed under high pressure into the cardboard such that it extends laterally into the hollows of the corrugated cardboard parts 8 and 9 as well as between the cardboard parts during the formation of the joint. The result is the formation of substantially irregularly formed disc or barb shaped anchoring portions 14 extending from the stem portion 12 into the parts being connected in the lateral direction of the parts. After the hardening of the plastic material, the nozzle holder 1 is raised by means of raising and lowering means 16, the connection being thereby produced.

In the event that the thickness of the cardboard parts being joined is great, it is advisable to pre-punch registering holes in the cardboard through which the plastic is forced under high pressure. This pre-punching may be performed in a work stage prior to the connecting of the parts. However, a punch needle 15 may be provided in the nozzle 6, for punching holes in the material being joined. Alternatively, if the nozzle 6 is strong enough, the nozzle 6 itself can be used to accomplish the punching operation, in which case no separate punch operation is necessary.

With thin cardboard or paper parts, or with corrugated cardboard parts, in which the wall thickness of the corrugations and of the covering sheets is relatively small, the plastic material is forced into the material with sufficient force so as to penetrate the paper or cardboard pieces, thereby improving the joining of the parts.

It is possible to inject the flowable plastic under pressure from both sides of the parts being joined. However, it is preferable to proceed in the manner shown in FIG. 1 since only a single nozzle and nozzle holder is required, and it is easier to overlay the cardboard parts on one another and to accurately locate same on a fixed base support means 2.

As mentioned above with respect to FIG. 1, the bulges 3 and 4 on the nozzle holder 1 and the base 2, respectively, crush the corrugations around the connection point when corrugated cardboard parts are being joined. This not only provides a depression within which the head portions 13 of the stem 12 are formed, but also, by crushing the corrugations around the connection point, the flowable plastic is prevented from spreading too far to the side into the hollows formed by the corrugations of the corrugated cardboard.

When hardboard parts are joined together using the method and apparatus of the present invention, the bulges 3 and 4 act to provide a secure mechanical hold-down of the parts prior to and during the forcing through of the flowable plastic material to form the permanent joint.

The stem portion 12 of the resulting plastic joint can take any desired shape, depending upon the profile shape of the spray nozzle 6 being used. For example, a circular, cruciform or rectangular cross-sectional shape could be provided.

In accordance with a further feature of the invention, two laterally spaced nozzles 6 could be provided in order to simultaneously provide two connecting stems 12 spaced from each other in the lateral direction of the material being joined. By providing appropriately dimensioned bulges 4 on the base support 2, a single lengthened common head-portion 13 could be formed which extends between both stems 12 on one side of the parts being joined. On the other side of the parts, single individual head portions 13 are provided for each stem 12. The result is a configuration similar to the well known metal staple or hook which is generally used in the art. The two stems and connecting head portions 13 are simultaneously formed and the result is an improved connection which exhibits the advantages of the present invention.

The plastic material used in the present invention may be any type of flowable plastic material having a relatively short hardening time. More particularly, thermoplastic materials are suitable for use, and it is possible to cool the pressed-through material with, for example, an air-jet, in order to shorten the hardening time. It should be clear that other plastic materials are suitable for use in the present invention. When the present invention is used for forming containers for goods, it is preferable that the plastic material has a relatively soft surface so as not to damage the contents of the container during packing and unpacking thereof.

It should be clear that various modifications and alterations could be made to the present invention without departing from the scope of the invention as set forth in the appended claims. The punching needle, in FIG. 1 if needed is slidably guided by spiders within the hollow of the nozzle 6. It is operatively coupled with raising and lowering means, generally indicated by block 21 in FIG. 1.

I claim:

1. A method for connecting parts made of cardboard, compressible material such as corrugated cardboard, paper, or the like, by means of a plastic material, comprising the steps of overlaying at least two non-perforate parts to be connected;

locally compressing said parts of compressible material together in the vicinity of the joining point thereof with a force sufficient to compact the parts to form a zone of compacted material or lesser thickness than the remainder of said parts;

pressing a sealing cup having a sealing edge against at least one surface of the compressible material;

forcing a flowable liquid plastic material through the overlaid parts substantially centrally of, and through the sealing cup at the joining point to form a plastic stem which penetrates and passes through the overlaid parts, said plastic stem having plastic material extending therefrom substantially laterally of the parts beneath the sealing cup and within the zone of compacted material and between the outer surfaces of said parts; and allowing said plastic material to harden, thereby forming a double-headed stem joining said parts together.

2. The method of claim 1, wherein said parts being joined are corrugated cardboard parts and the step of compressing the parts comprises crushing the corrugated cardboard parts.

3. The method of claim 2, wherein said corrugations are compressed in the longitudinal direction of the corrugations in the area of the connecting point.

4. The method of claim 2, wherein the step of forcing the flowable liquid plastic materials through the overlaid parts comprises applying sufficient pressure force to the flowable liquid plastic material to penetrate laterally into the spaces formed by the corrugations of the cardboard parts.

5. The method of claim 1, comprising locating said parts to be joined on a flat base support member having outwardly bulging means and a depression therein to form a counter sealing cup located at the opposite surface and aligned with the connection point.

6. The method of claim 1, comprising cooling said plastic material after it is forced through said parts to shorten the hardening time.

7. The method of claim 1, wherein the parts being joined include parts having interstitial spaces within their thickness and wherein the step of forcing the flowable liquid plastic material through the overlaid parts comprises
   applying sufficient pressure force to the flowable liquid plastic material so that the flowable liquid plastic material will be forced into an inner tray laterally into the interstitial spaces of said parts.

References Cited
UNITED STATES PATENTS

| | | | |
|---|---|---|---|
| 2,391,938 | 1/1946 | Baker | 156—92 |
| 2,557,668 | 6/1951 | Lincoln | 156—500 |
| 2,890,481 | 6/1959 | Leahy, et al. | 156—500 |
| 3,350,249 | 10/1967 | Gregoire | 156—253 |
| 2,366,274 | 1/1945 | Luth et al. | 156—293 |
| 3,122,465 | 2/1964 | Keller et al. | 156—253 |

DOUGLAS J. DRUMMOND, Primary Examiner

U.S. Cl. X.R.

156—253, 295, 303.1